(12) United States Patent
Samadi

(10) Patent No.: US 9,875,673 B2
(45) Date of Patent: Jan. 23, 2018

(54) ILLUMINATED AERIAL AIRCRAFT DISPLAY

(71) Applicant: Jamsheed James Samadi, Leesburg, VA (US)

(72) Inventor: Jamsheed James Samadi, Leesburg, VA (US)

( * ) Notice: Subject to any disclaimer, the term of this patent is extended or adjusted under 35 U.S.C. 154(b) by 0 days.

(21) Appl. No.: 14/187,019

(22) Filed: Feb. 21, 2014

(65) Prior Publication Data

US 2016/0293072 A1    Oct. 6, 2016

Related U.S. Application Data

(63) Continuation-in-part of application No. 12/978,053, filed on Dec. 23, 2010, now abandoned.

(60) Provisional application No. 61/289,991, filed on Dec. 23, 2009.

(51) Int. Cl.
*G09F 21/08* (2006.01)
*G09F 21/10* (2006.01)

(52) U.S. Cl.
CPC .............. *G09F 21/08* (2013.01); *G09F 21/10* (2013.01)

(58) Field of Classification Search
CPC ................................. G09F 21/08; G09F 21/10
USPC ......................................................... 40/215
See application file for complete search history.

(56) References Cited

U.S. PATENT DOCUMENTS

| 1,974,039 | A | * | 9/1934 | Gilbert | G09F 21/14 40/215 |
|---|---|---|---|---|---|
| 2,095,350 | A | * | 10/1937 | Soule | G09F 21/14 40/215 |
| 2008/0104870 | A1 | * | 5/2008 | Alden | G09F 9/33 40/422 |
| 2009/0108135 | A1 | * | 4/2009 | Shaw | B64C 3/30 244/158.3 |
| 2010/0122479 | A1 | * | 5/2010 | Golle | G09F 21/14 40/215 |
| 2011/0146118 | A1 | * | 6/2011 | Samadi | G09F 21/12 40/215 |

* cited by examiner

*Primary Examiner* — Gary Hoge

(57) ABSTRACT

An illuminated aerial aircraft display is disclosed. The display may be towed by an airplane with a propeller with a front facing with a plurality of illuminated indicia that includes letters and numbers and illuminated computer generated or non-computer generated moving indicia or pictorial images disposed on the front facing and a wind milling generator installed on a lead pole of the illuminated aerial aircraft display and a plurality of LED lights that illuminate the illuminated indicia. The display has illuminated indicia that may utilize a wide variety of colors and aesthetically pleasing styles and works in combination with the propeller that spins and produces electricity utilized by the LED lights once the illuminated aerial aircraft display is picked up and towed by the aircraft. One or more batteries may also be utilized to power the LED lights.

20 Claims, 6 Drawing Sheets

ILLUMINATED AERIAL AIRCRAFT DISPLAY

The present application is a Continuation-In-Part application to U.S. Non-Provisional application Ser. No. 12/978,053 filed on Dec. 23, 2010 and the present application claims priority to U.S. Provisional Application 61/289,991 filed on Dec. 23, 2009, the entire disclosures of both applications are incorporated herein by reference.

TECHNICAL FIELD & BACKGROUND

Aerial advertising by way of banner towing has always been a daytime operation. There have been attempts to light-up banners behind aircraft with the use of spotlights on the aircraft which have not been successful. There are also systems available for blimps and small aircraft, by way of computerized moving letters, which are illuminated but are small and very hard to read, especially on the aircraft which have to be directly flown overhead to be seen and for urban areas where the aircraft must be no lower than approximately fifteen-hundred feet above the ground.

SUMMARY OF THE INVENTION

The present invention generally relates to an illuminated display. More specifically, the invention is a portable illuminated aerial aircraft display.

The present invention is a front facing with a plurality of illuminated indicia disposed on the front facing, the illuminated indicia includes illuminated computer generated moving indicia or pictorial images, an electricity production unit installed on a lead pole of the illuminated aerial aircraft display, the electricity production unit is a wind milling generator and a plurality of lights that illuminate the illuminated indicia utilizing electricity produced by the electricity production unit, wherein the illuminated aerial aircraft display is towed by an airplane with a propeller.

It is an object of the invention to provide an illuminated aerial aircraft display that will illuminate banners and other advertising and display media towed by an aircraft at night.

It is an object of the invention to provide an illuminated aerial aircraft display that may provide aerial advertising and displays over cities and jammed highways at night, nighttime ball games and other nighttime events.

What is really needed is an illuminated aerial aircraft display that will illuminate banners and other advertising and display media towed by an aircraft at night and that may provide aerial advertising and displays over cities and jammed highways at night, nighttime ball games and other nighttime events.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments. Various operations will be described as multiple discrete operations, in turn, in a manner that is most helpful in understanding the present invention.

However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
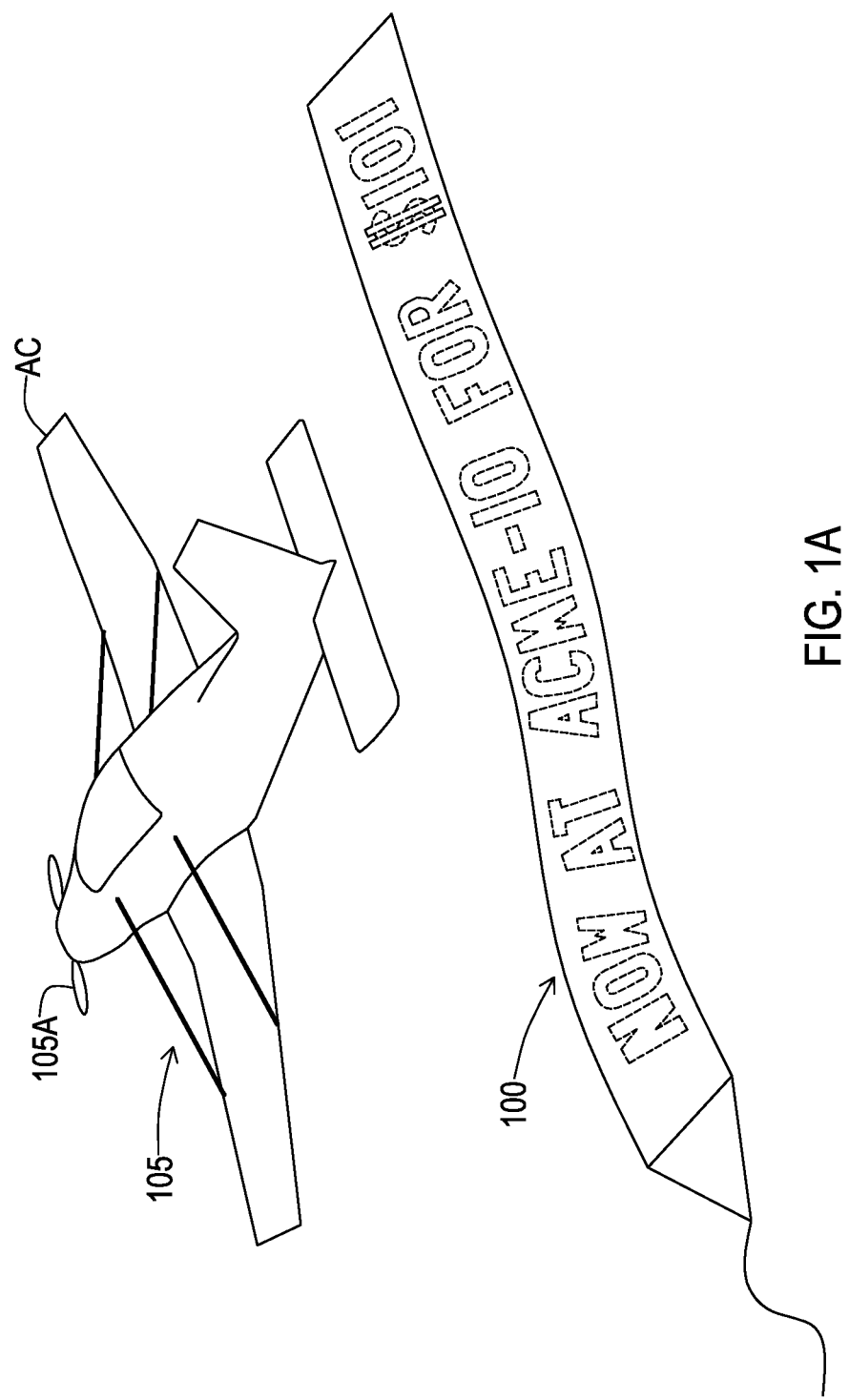
FIG. 1A illustrates an environmental side perspective view of an illuminated aerial aircraft display and an aircraft, in accordance with one embodiment of the present invention.

FIG. 1A illustrates an environmental perspective view of an illuminated aerial aircraft display 100 and an aircraft AC, in accordance with one embodiment of the present invention. The illuminated aerial aircraft display 100 may be towed by any aircraft AC of any size such as an airplane 105 with a propeller 105A. The illuminated aerial aircraft display 100 may be any material that may support the components of the illuminated aerial aircraft display 100 and is typically made of planar sheet-like material that may be easily towed by the aircraft AC and be easily seen at night.

Figure 1B:
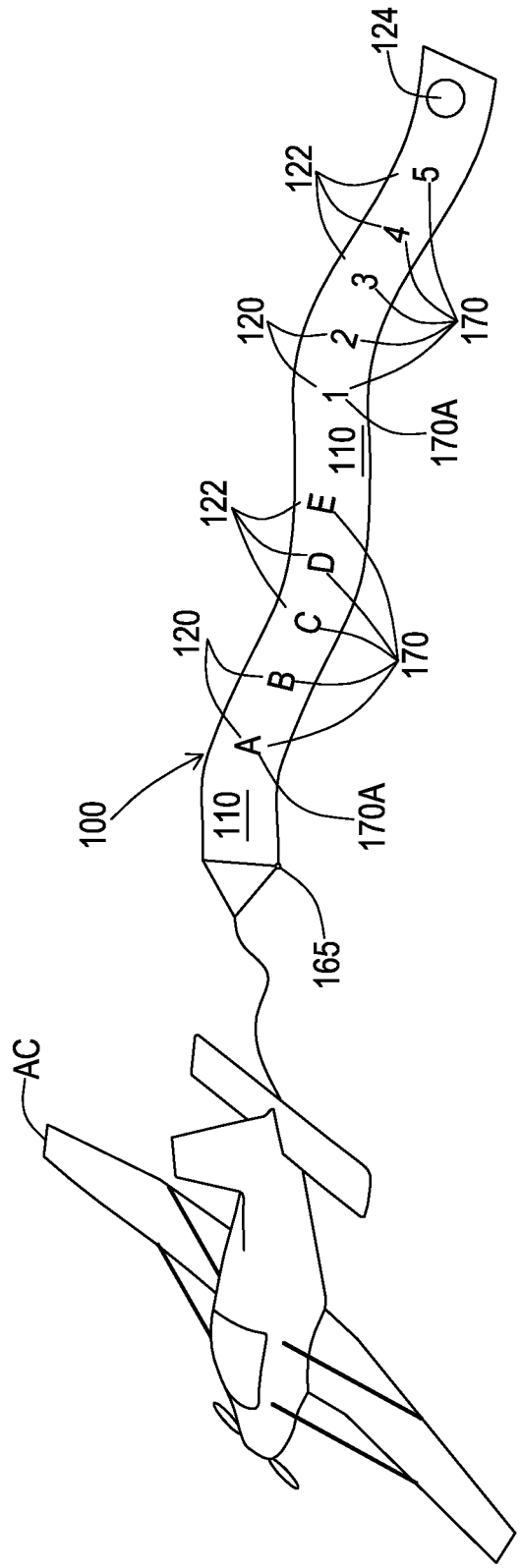
FIG. 1B illustrates a side perspective view of an illuminated aerial aircraft display for basic indicia powered by an aircraft, in accordance with one embodiment of the present invention.

FIG. 1B illustrates an overhead perspective view of an illuminated aerial aircraft display 100 powered by an aircraft AC, in accordance with one embodiment of the present invention. The illuminated aerial aircraft display 100 may have a front facing 110 that has a plurality of illuminated indicia 120 such as letters and numbers disposed on the illuminated aerial aircraft display 100. The illuminated indicia 120 may include a plurality of illuminated computer generated moving indicia 122 or a plurality of pictorial images 124. The illuminated indicia 120 may be approximately in the range of five to seven feet high, although the illuminated indicia 120 may be other suitable heights as well. The illuminated indicia 120 may be in a wide variety of colors and aesthetically pleasing styles.

One previous problem with trying to make an illuminated aerial aircraft display 100 has been getting electricity to the illuminated aerial aircraft display 100 to light-up the illuminated indicia 120. The illuminated aerial aircraft display 100 has an electricity production unit 130, which is a wind milling generator 140 installed on the lead pole 150 of the bottom 160 of the illuminated aerial aircraft display 100, which replaces a weight unit (not shown) which is typically on other aerial aircraft displays. The wind milling generator 140 may also be housed in a cage with a plurality of surrounding springs to prevent damage when dropped off of the aircraft AC, as illustrated and described in FIG. 1D. Once the illuminated aerial aircraft display 100 may be picked-up and towed by the aircraft AC, the propeller 105 of the aircraft AC starts spinning and producing electricity, which in turn will be utilized to illuminate the illuminated indicia 120 with a plurality of light emitting diodes or LED lights 170 or a plurality of organic light emitting diodes or OLED lights 170A. The wind milling generator 140 may work in combination with the propeller 105 that spins and produces electricity to be utilized by the LED lights 170 or other types of lights.

Figure 1C:
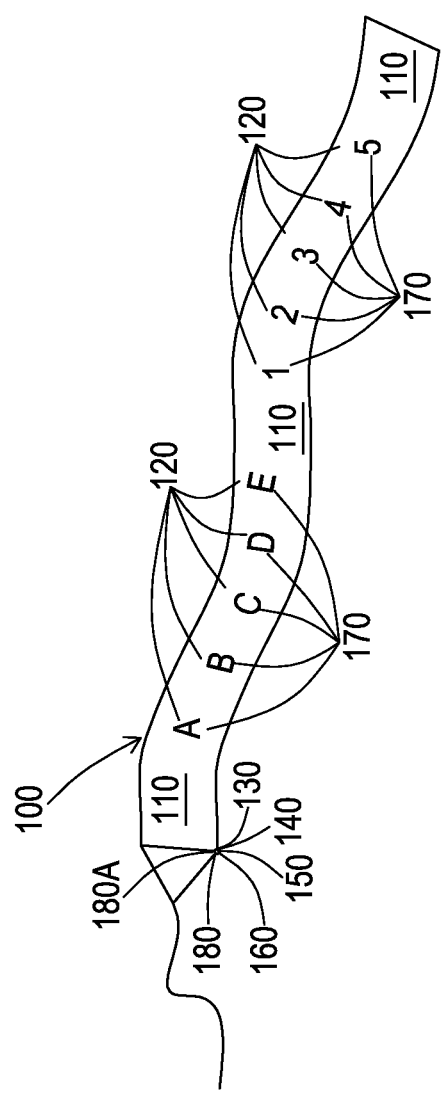
FIG. 1C illustrates a side perspective view of an illuminated aerial aircraft display for basic indicia powered by one or more batteries, in accordance with one embodiment of the present invention.

FIG. 1C illustrates a side perspective view of an illuminated aerial aircraft display 100 for basic indicia powered by a power source 180 such as one or more batteries 180A, in accordance with one embodiment of the present invention. All of the features of the illuminated aerial aircraft display 100 are the same as the illuminated aerial aircraft display 100 embodiment described in the FIG. 1B description, except that this embodiment is not powered by the aircraft AC. This embodiment of the illuminated aerial aircraft display 100 may be powered by one or more batteries 180A disposed on the bottom 160 of the lead pole 150 to allow for the illuminated aerial aircraft display 100 to operate independent of any power from the aircraft AC. The power source 180 may be disposed within the front facing 110. The power source 180 may provide electrical power to the illuminated aerial aircraft display 100.

Figure 1D:
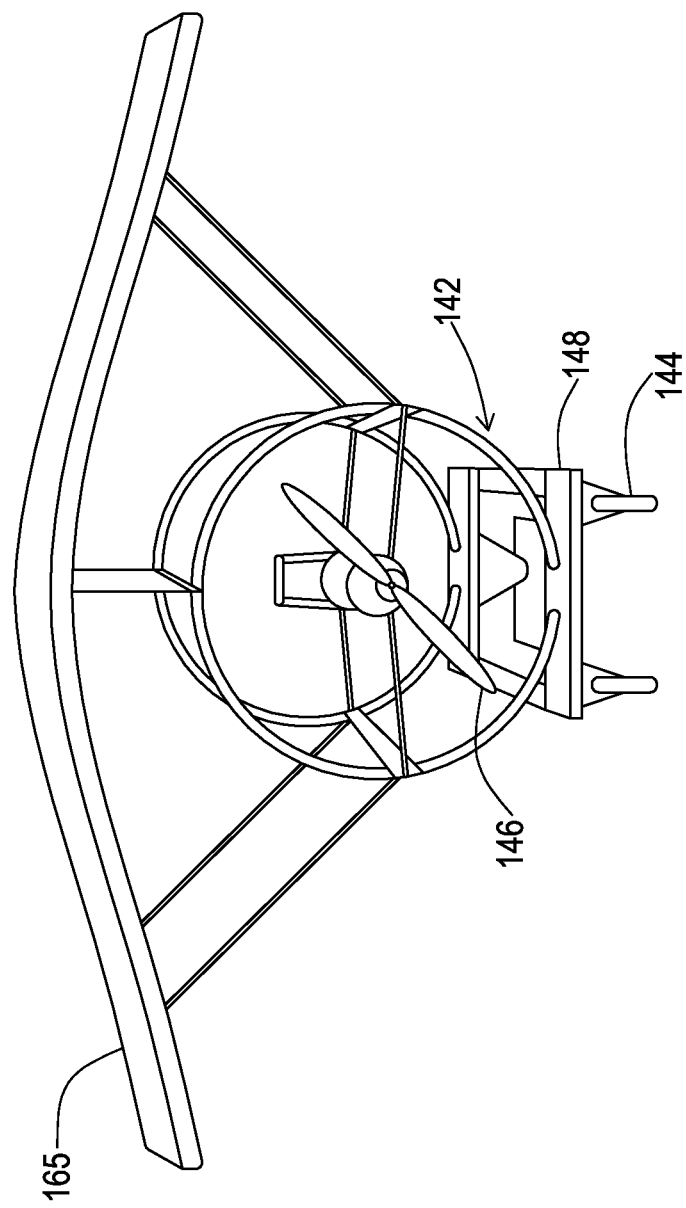
FIG. 1D illustrates a front perspective view of a wind milling generator housed in a cage with surrounding springs, in accordance with one embodiment of the present invention.

FIG. 1D illustrates a front perspective view of a wind milling generator 140 housed in a cage 142 with surrounding springs 144, in accordance with one embodiment of the present invention. As previously described in the FIG. 1B description, the wind milling generator 140 is housed in a cage 142 and surrounding springs 144 to prevent damage when dropped off of the aircraft AC. The wind milling generator 140 may be also provided with a propeller 146 to further ease impact on the wind milling generator 140 as it is released from an aircraft AC and lands on the ground and may be set on a platform 148 for further stability.

Figure 2:
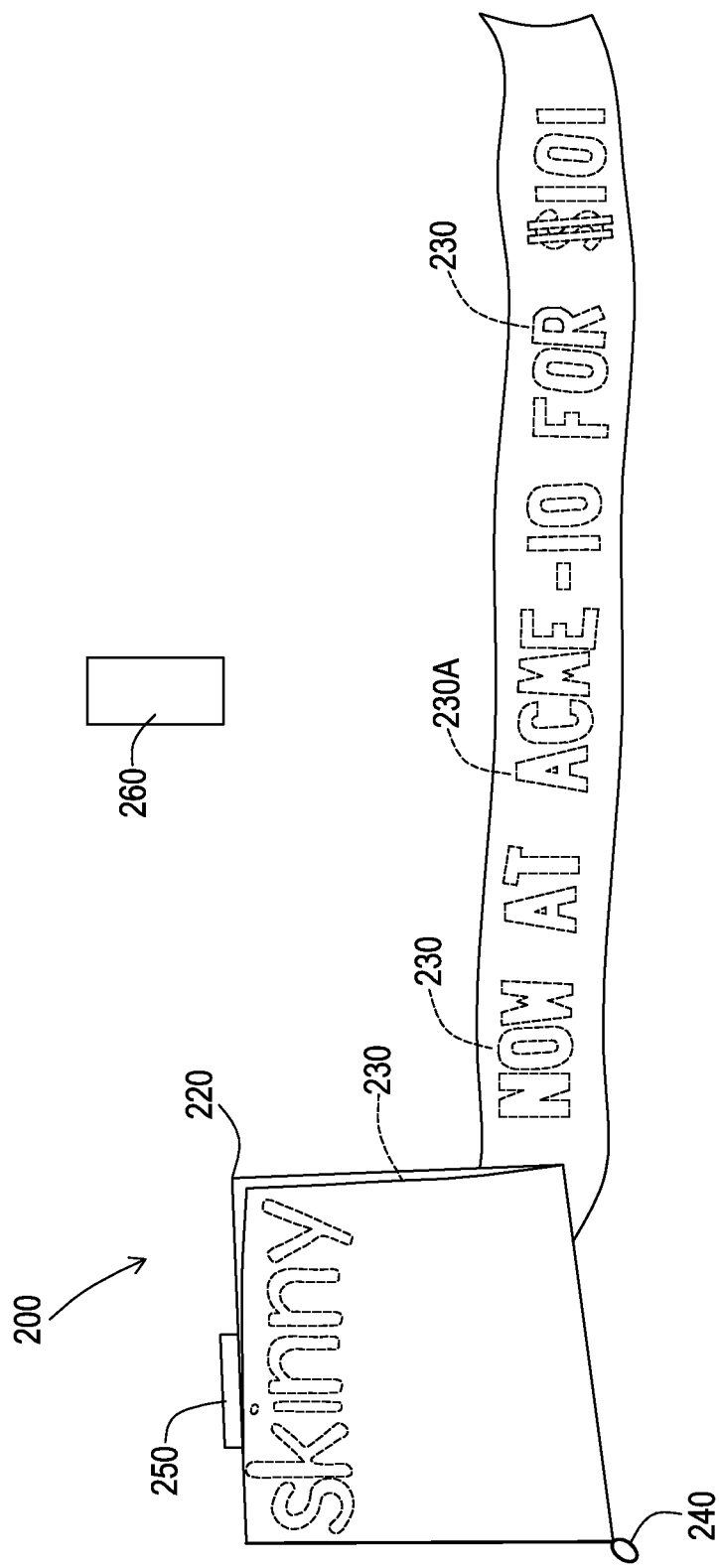
FIG. 2 illustrates an overhead perspective view of an illuminated aerial aircraft display for moving letters or pictorial images, in accordance with one embodiment of the present invention.

FIG. 2 illustrates an overhead perspective view of an illuminated aerial aircraft display 200 for moving letters 210 or pictorial images 220, in accordance with one embodiment of the present invention. The illuminated aerial aircraft display 200 may also be utilized to produce illuminated computer generated or non-computer generated moving indicia 210 or pictorial images 220 disposed on the illuminated aerial aircraft display 200. Like the illuminated indicia 120 described in the FIGS. 1A and 1B descriptions, the moving indicia 210 or pictorial images 220 may be disposed on the illuminated aerial aircraft display 200 may be illuminated with a plurality of LED lights 230 or a plurality of OLED lights 230A. Also like the illuminated indicia 120 described in the FIGS. 1A and 1B descriptions, once the illuminated aerial aircraft display 200 may be picked-up and towed by the aircraft AC, the propeller (FIG. 1A, 105) of the aircraft AC starts spinning and producing electricity, which in turn will be utilized to illuminate the moving indicia 210 or pictorial images 220 disposed on the illuminated aerial aircraft display 200 which are illuminated with a plurality of LED lights 230. One or more batteries 240 may also be utilized to power the plurality of LED lights 230 independent from the aircraft AC as is described in the FIGS. 1A and 1B descriptions. The illuminated aerial aircraft display 200 may also include a solar panel 250 to generate electrical energy by converting solar energy from sunlight into the generated electrical energy. The illuminated aerial aircraft display 200 may also include a remote control 260 that may control the illuminated aerial aircraft display 200. The lights 230 may illuminate the illuminated indicia (FIG. 1B, 120). The lights 230 may utilize electricity produced by the electricity production unit (FIG. 1B, 130) and provided by the power source (FIG. 1B, 180). The lights may be installed on the illuminated aerial aircraft display 200 while the illuminated aerial aircraft display 200 is towed by an airplane (FIG. 1, 105) with a first propeller (FIG. 1A, 105A).

Figure 3:
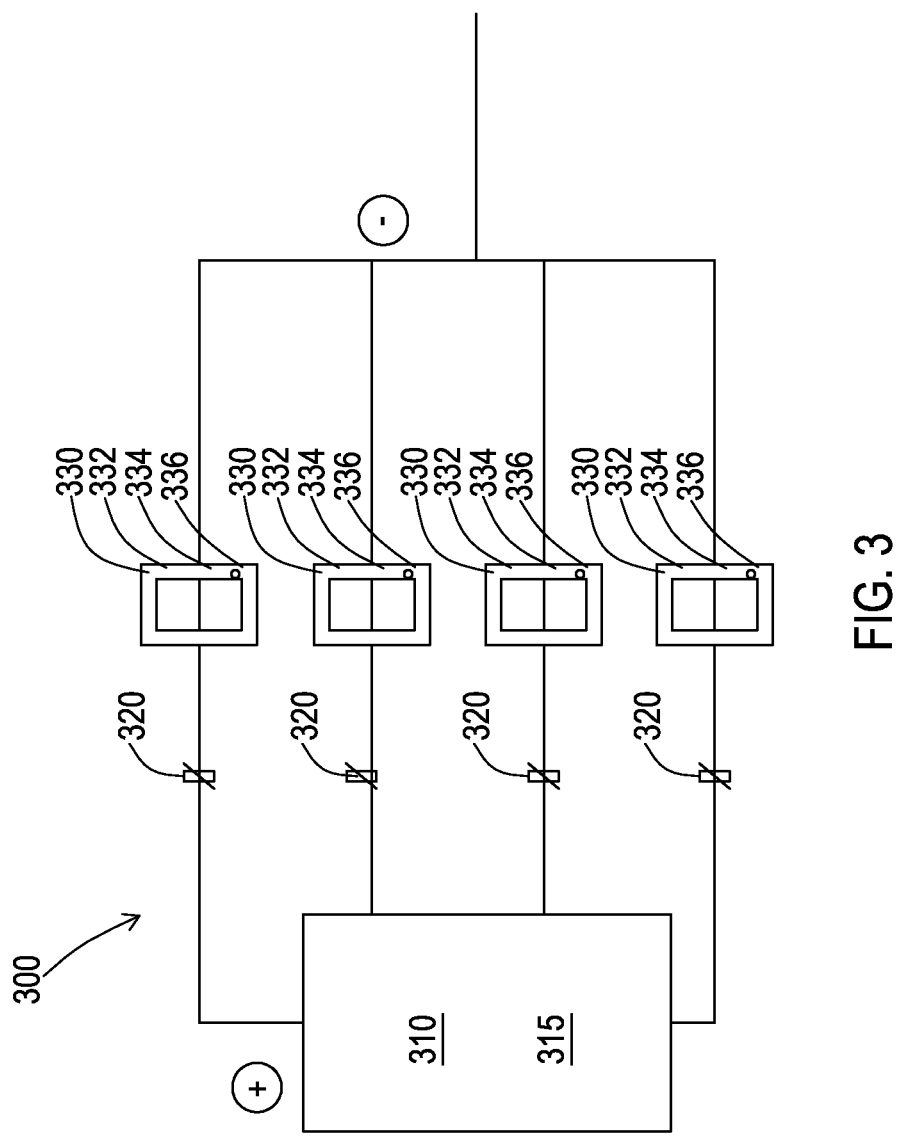
FIG. 3 illustrates a schematic electrical diagram of an illuminated aerial aircraft display, in accordance with one embodiment of the present invention.

FIG. 3 illustrates a schematic diagram of an electrical system of an illuminated aerial aircraft display 300, in accordance with one embodiment of the present invention. The electrical system 300 may include a wind milling generator 310 and one or more batteries 315 previously described in the FIG. 1A and FIG. 1B description, a plurality of variable resistors 320 and a plurality of LED lights 330 may accommodate a plurality of illuminated indicia 332 such as letters and numbers or illuminated computer generated or non-computer generated moving indicia 334 or pictorial images 336. The LED technology for the plurality of illuminated indicia 332 such as letters and numbers or illuminated computer generated or non-computer generated moving indicia 334 or pictorial images 336 is known and utilized in FIG. 3.

The illuminated aerial aircraft display 300 may also utilize other types of lights other than LED lights (FIG. 1B, 170) for illumination. Other electricity production units (FIG. 1B, 130) may also be utilized to power the illuminated aerial aircraft display 300. The components of the illuminated aerial aircraft display 300 may also be utilized independently of an aircraft AC to illuminate fabric billboards as well.

The illuminated aerial aircraft display may also utilize either a plurality of LEDs or a plurality of organic light-emitting diode or OLED lights. The illuminated aerial aircraft display may also utilize a remote control which will change the color of the LED lights while in the air. The power source of the illuminated aerial aircraft display is one or more batteries disposed on the bottom of a lead pole to allow for the illuminated aerial aircraft display to operate independent of any power from the aircraft AC, which is internal on the banner itself and independent from the aircraft. The small wind milling generator may be disposed at the bottom of a lead pole with a retractable propeller or one or more batteries. The illuminated aerial aircraft display may also include a solar panel.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. An illuminated aerial aircraft display, comprising:
   a front facing having a plurality of illuminated indicia, said illuminated indicia include a plurality of illuminated computer generated moving indicia or a plurality of pictorial images;
   an electricity production unit installed on a lead pole of said illuminated aerial aircraft display, said electricity production unit is a wind milling generator;
   a power source disposed within said front facing, said power source provides electrical power to said illuminated aerial aircraft display; and
   a plurality of lights illuminating said illuminated indicia, said lights utilizing electricity produced by said electricity production unit and provided by said power source, wherein said lights are installed on said illuminated aerial aircraft display while said illuminated aerial aircraft display is towed by an airplane with a first propeller.

2. The illuminated aerial aircraft display according to claim 1, wherein said illuminated indicia include a plurality of letters and numbers.

3. The illuminated aerial aircraft display according to claim 1, wherein said wind milling generator works in combination with said first propeller, said first propeller spins and produces electricity utilized by said lights.

4. The illuminated aerial aircraft display according to claim 3, wherein said first propeller spins and produces electricity utilized by said lights once said illuminated aerial aircraft display is picked-up and towed by said aircraft.

5. The illuminated aerial aircraft display according to claim 1, wherein said wind milling generator is housed in a cage with a plurality of surrounding springs and a second propeller.

6. The illuminated aerial aircraft display according to claim 1, wherein said lights are LED lights.

7. The illuminated aerial aircraft display according to claim 6, wherein said lights are a plurality of OLED lights.

8. The illuminated aerial aircraft display according to claim 1, wherein said power source is one or more batteries.

9. The illuminated aerial aircraft display according to claim 8, further comprising a remote control which will change one or more colors of the LED lights while the illuminated aerial aircraft display is flying in the air.

10. An illuminated aerial aircraft display towed by an airplane with a first propeller, comprising:
    a front facing having a plurality of illuminated indicia, said illuminated indicia include a plurality of letters and numbers disposed on said front facing, said illuminated indicia includes a plurality of illuminated computer generated moving indicia or a plurality of pictorial images;
    an electricity production unit installed on a lead pole of said illuminated aerial aircraft display, said electricity production unit is a wind milling generator;
    a power source disposed within said front facing, said power source provides electrical power to said illuminated aerial aircraft display; and
    a plurality of LED lights illuminating said illuminated indicia, said LED lights utilizing electricity produced by said electricity production unit and provided by said power source, wherein said LED lights are installed on said illuminated aerial aircraft display while said illuminated aerial aircraft display is towed by an airplane with s aid first propeller.

11. The illuminated aerial aircraft display according to claim 10, wherein said wind milling generator works in combination with said first propeller.

12. The illuminated aerial aircraft display according to claim 11, wherein said wind milling generator works in combination with said first propeller, said first propeller spins and produces electricity.

13. The illuminated aerial aircraft display according to claim 12, wherein said first propeller spins and produces electricity utilized by said LED lights once said illuminated aerial aircraft display is picked up and towed by said aircraft.

14. The illuminated aerial aircraft display according to claim 10, wherein said wind milling generator is housed in a cage with a plurality of surrounding springs and a second propeller.

15. The illuminated aerial aircraft display according to claim 10, wherein said LED lights are a plurality of OLED lights.

16. The illuminated aerial aircraft display according to claim 10, wherein said power source is one or more batteries.

17. An illuminated aerial aircraft display towed by an airplane with a first propeller, comprising:
    a front facing having a plurality of illuminated indicia, said illuminated indicia includes a plurality of advertising letters and numbers and illuminated computer generated moving indicia or pictorial images disposed on said front facing;
    a wind milling generator installed on a lead pole of said illuminated aerial aircraft display, said wind milling generator is housed in a cage with a plurality of surrounding springs and a second propeller;
    a power source disposed within said front facing, said power source provides electrical power to said illuminated aerial aircraft display, wherein said power source is one or more batteries; and
    a plurality of LED lights illuminating said illuminated indicia, said LED lights utilizing electricity produced by said electricity production unit and said power source, wherein said LED lights are installed on said illuminated aerial aircraft display while said illuminated aerial aircraft display is towed by an airplane with s aid first propeller.

18. The illuminated aerial aircraft display according to claim 17, wherein said wind milling generator works in combination with said first propeller that spins and produces electricity utilized by said LED lights once said illuminated aerial aircraft display is picked-up and towed by said aircraft.

19. The illuminated aerial aircraft display according to claim 17, wherein said LED lights are a plurality of OLED lights.

20. The illuminated aerial aircraft display according to claim 17, wherein said illuminated aerial aircraft display is made of planar material.

* * * * *